United States Patent [19]

Riley, Jr et al.

[11] Patent Number: 4,526,384
[45] Date of Patent: Jul. 2, 1985

[54] SEAL HAVING CASING UNIT WITH CONTOURED ANNULAR INNER DIAMETER

[75] Inventors: William M. Riley, Jr, Gurnee; Gregory R. Vassmer, Elgin, both of Ill.

[73] Assignee: Chicago Rawhide Mfg. Co., Elgin, Ill.

[21] Appl. No.: 554,893

[22] Filed: Nov. 25, 1983

[51] Int. Cl.³ ............................................. F16J 15/32
[52] U.S. Cl. .................................. 277/153; 277/166; 277/186; 277/189
[58] Field of Search ..................... 277/47–50, 277/152, 153, 164, 165, 166, 178, 186, 189

[56] References Cited

U.S. PATENT DOCUMENTS

| 2,249,141 | 7/1941 | Johnson | 277/152 |
| 4,240,643 | 12/1980 | Becker et al. | 277/164 |
| 4,298,203 | 11/1981 | Holzer et al. | 277/152 |
| 4,326,723 | 4/1982 | Arai | 277/153 |

FOREIGN PATENT DOCUMENTS

| 867189 | 2/1953 | Fed. Rep. of Germany | 277/47 |
| 508713 | 7/1939 | United Kingdom | 277/47 |
| 569821 | 6/1945 | United Kingdom | 277/153 |

Primary Examiner—Robert S. Ward
Attorney, Agent, or Firm—James T. FitzGibbon; Angelo J. Bufalino

[57] ABSTRACT

An oil seal unit including an elastomeric sealing lip portion and a casing portion made from a rigid material and having a mounting flange, a radially extending, offsetting flange, and an annular inner mounting bead formed by folding at least two thicknesses of the casing material upon each other so as to form first and second inclined flange portions connected to each other by a bight portion, one of the thicknesses terminating in an edge portion and with the bight portion presenting a rounded exterior surface portion directed generally toward the sealed region and the inner diameter of the seal, the sealing lip portion having air and oil side surfaces meeting each other along a circumferential locus to define a seal band, and having another portion bonded to and completely surrounding an inner margin of the radial casing flange and the exterior surfaces and edge portion of the material thicknesses forming the bead, to provide a bonded area adapted to resist failure under the application of high pressure.

11 Claims, 6 Drawing Figures

SEAL HAVING CASING UNIT WITH CONTOURED ANNULAR INNER DIAMETER

BACKGROUND OF THE INVENTION

The present invention relates generally to fluid seals, and more particularly, to particular types of oil or like fluid seals, including those which are adapted to work in high pressure environments.

While early fluid seals, particularly for oil, were of a relatively simple design adapted merely to retain grease or the like within a sealed region, development of materials and design, together with requirements of newly developed machines, have resulted in oil seals which are extremely sophisticated and which are able to operate satisfactorily even in very severe service environments. These environments include working with fluids of very low viscosity, operating under high temperature and pressure, and permitting relative movement of varying and complex kinds.

In particular, while many seals are adapted merely to permit relative rotary motion between two sealed parts, and comprise a casing or stiffener portion having a formed annular elastomeric lip bonded thereto, and such seals are usually adapted only to allow relative rotary motion of sealed parts which operate under low pressure. More recently, however, improvements have been made which allow elastomeric lip seals to snugly engage rods or shafts, including those which undergo both reciprocating and rotating motion.

These seals, particularly in specialized applications such as automotive, agricultural, aircraft or like power steering units, for example, or other high pressure hydraulic environments, are adapted to permit both rotary and reciprocating motion, and to achieve a so-called pressure balance both within and without the sealed environments so that increased pressure snugly urges the sealing lip against the sealed member in a more fluid-tight relation, but nevertheless permits desired motion without undue friction or seal damage.

Seals performing in this environment without undue wear often include additional components to prevent the pressure from deforming or extruding the seal along the axis of the shaft or other sealed part. Consequently, it is not uncommon for a seal to include its own primary radially acting lip, and one or more other auxillary lips, but also to include backup rings or washers of a more dimensionally stable material, such as nylon or other synthetic plastic material, and to have these components further backed up or situated by metal rings, clips, washers or the like.

In the development of seals of this kind, great emphasis has been placed on proper pressure balance, prelubrication, lip and spring design, fitting tolerances and the like. However, although great progress has been made, to the point where many applications may be sealed for a period of years without difficulty while permitting operation under pressures from 700 to 1500 psi, and permitting both rotation and reciprocation without substantial loss of fluid, seal failures have begun to be noted in other areas of the seal. According to the present invention, a seal casing or stamping member is made which is adaptable for use with existing molding processes but which is contoured so as to minimize or eliminate undersirable stress concentration where there is a transition between a supported and an unsupported portion of the elastomeric seal.

By way of example, the siffener casing or stamping of a lip seal often comprises an "L" shaped or other contoured annular metal member, usually steel, and usually made by stamping. At the outer diameter of the seal is a mounting flange which may be coated or uncoated steel per se, or may have a rubber or rubberized coating over the exterior thereof, facilitating snug reception in the counterbore of an associated machine member.

The remainder of this casing is used to bond the elastomer and secure it in place, and such seal stiffener or casing normally terminates at its innermost diameter in an edge which is formed as the stamping is formed by a piercing or blanking operation. This area of the inner margin of the casing is sometimes ground or sanded to remove burrs or cut edges, and is then treated for protection against corrosion, as with a phosphate or tin-containing coating, followed by an application of bonding cement. The casing as a whole is then situated with its radially inner margin held within a portion of a compression or injection mold and the seal is formed in such a way as to have its lip portion bonded to the seal during molding.

In the use of such sealing, application of high pressure has been found to cause failures where the pressure tends to displace the unsupported elastomeric seal from the casing in the vicinity of its inside diameter, usually at a sharp edge.

While seals of the type of which the invention is concerned are often not particularly expensive, especially in view of the precision of which they are made, and the high quality materials from which they are made, a seal is often a critical part insofar as it forms a portion of a vital mechanism, often inaccessible, which has a requirement for continued lubrication. Replacing a faulty seal involves effort and inconvenience greatly in excess of that of the cost of the seal per se. Accordingly, there has been a demand for seals which hold out the promise of extended service life in use, and particularly those which are not likely to be rapidly destroyed or damaged by their own working environments.

In view of the need to provide an improved seal for high pressure applications, it is an object of the present invention to provide an improved seal having a contoured casing or stiffener portion.

Another object of the invention is to provide an improved seal which is resistant to failure in high pressure applications.

Yet another object is to provide a seal having a casing which includes an annular bonding bead of increased surface aread and contoured cross-sections, formed in one diameter of the seal casing.

Still another object is to provide a fluid seal for use in high pressure sealing applications, which resists separation or tearing of the elastomer of adjacent the interface between the casing and the elastomer, particularly adjacent a sharp edge thereof.

Yet another object of the invention is to provide a fluid seal unit which provides a marginal bonding portion constructed and arranged so as to cooperate with the bonded elastomeric annular lip seal portion in such a way as to resist failure in use.

A further object of the invention is to provide a casing for a seal unit which includes an annular mounting portion, an intermediate portion and a radially innermost bonding portion, with the bonding portion providing a rounded contour, greatly increased bonding area, and a continuous surface extending from the oil side to at least a part of the air side of the seal casing.

A still further object of the invention is to provide a seal which may be made using existing techniques without measurably increasing the cost of production.

Still another object of the invention is to provide a seal which is conventional in most respects but which is advantageously used in high pressure environments and which may be made without measurable increase in manufacturing costs or requiring the use of additional, exotic materials.

Another object of the invention is to provide a seal which includes a contoured casing and which is adaptable for use in different installations without requiring redesign of the sealed parts.

The seal of the invention achieves these and other inherent and advantages by providing a design which equilizes shearing and other destructive stresses in the finished seal when it is subjected to high pressure application by providing a casing having an inner margin with an increased surface area, and bonding bead having a contoured cross-section, smooth exterior contours, with the bonding surface comprising oil and air side portions, with the entire bonding bead being surrounded by portions of the seal lip body.

The invention also achieves its objects by providing a seal casing which is adapted to receive a bonded lip portion and which may be made without the use of unusual or expensive tools.

The exact manner in which the invention achieves these and other of its objects in practice will be more clearly apparent when reference is made to the following detailed description of the preferred embodiments of the invention set forth by way of example, and shown in the accompanying drawings, wherein like reference numbers indicate corresponding parts throughout.

DESCRIPTION OF THE PREFERRED EMBODIMENTS OF THE INVENTION

Figure 1:
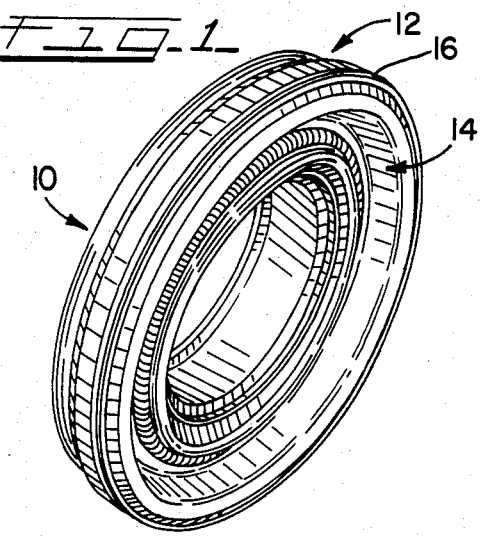
FIG. 1 is a perspective view of the seal of the invention, showing the principal elements thereof.

While the principles of the invention are applicable to various forms of seals, an illustrative description will be made of a relatively simple form of seal adapted for use in a high pressure environment and shown without conventional auxiliary components such as backup washers, springs, or anti-extrusion elements Referring now to the drawings in greater detail, FIG. 1 shows a seal unit generally designated 10 and shown to include a rigid casing portion generally designated 12 and an elastomeric portion generally designated 14 and, for purposes of the description, being subdivided into a rubber, outer diameter mounting bead portion 16, an intermediate body portion 18, and a lip body portion 20. The lip body in turn is subdivided into a primary lip body 22, an excluder or auxiliary lip body 24, and a bonding portion 26.

The casing 12 includes a radially outermost axial flange 28 serving as the mounting support portion, a bend or radius portion 30, a radially extending flange 32, and an inner bonding bead portion generally designated 34.

Figure 2:
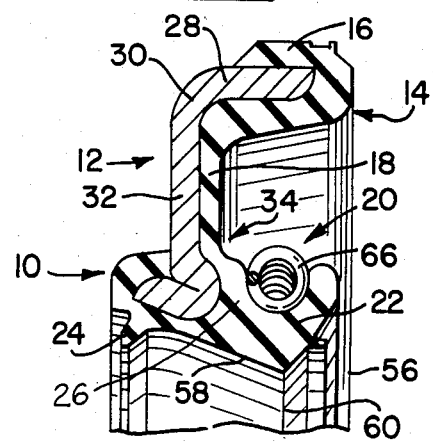
FIG. 2 is a vertical sectional view, on an enlarged scale, of a portion of the seal unit of the invention, showing the same in its as-manufactured condition.
Figure 3:
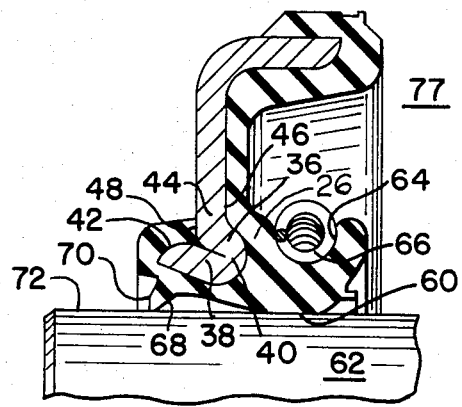
FIG. 3 is a sectional view similar to that of FIG. 2, but showing the seal in an installed position of use over an associated shaft forming a part of the sealed mechanism.

According to the invention, the mounting bead portion 16 comprises a first inclined metal thickness 36 followed upon another thickness 38 about a bight portion 40, with the second inclined metal thickness 38 terminating at the innermost edge 42. The casing as a whole thus includes the flange 28 and 32, while the flange 32 includes an inner margin 44 having opposed oil and air side surfaces 46, 48 facing respectively toward and away from the sealed region. Herein, and in the claims, the word "axial inner", or "axially inwardly" will be understood to mean toward the sealed region, that is, to the right as shown in FIGS. 2 and 3, for example. Besides the margin 44 having the surfaces 46 and 48 the casing unit 12 (see FIG. 6) includes the annular bonding bead 34 which includes the inwardly directed flange surface 50, the adjacent flange surface 52 directed readily inwardly of the seal inner diameter, and the inclined surface 54 which is directed readily inwardly but also somewhat axially outwardly. It will thus be appreciated, the rubber lip body portion 20 may actually be considered to store at the lower portion of the web 18 wherein it is bonded to the marginal surface 46, and to be bonded continually around the respective curvilinear surface 50, 52 and 54. The body also prefereably covers the innermost edge 42 of the casing 12 as well as the axially outwardly directed margin surface 48 of the casing 12. Consequently, the lip body is bonded to the casing along a continuous curvilinear annular bead formation of increased cross-section relative to the cross-section of the remainder of the stamping period. The bead inclined marginal flanges 36, 38 are shown as being followed so as to actually lie upon or adjacent each other, although it will be understood that they may merely lie adjacent and closely spaced apart from each other, as long as the radially inner portion of the casing includes the contoured margin which is free from sharp edges along the entire extent of the body which is exposed to high pressure within the seal casing.

An oil side frusto-conical lip surface 56 and a so-called air side frusto-conical lip surface 58 with these surfaces meeting along a generally cylindrical locus to form a seal band 60 of primary intended contact with an associated shaft 62 (FIG. 3) or other sealed member. The lip body also includes a spring groove 64 adapted to accommodate a spring 66, with the auxiliary or excluder lip 24 formed by axially inner and outer surfaces 68, 70.

Referring now to FIG. 3, the seal of the invention is shown to be in position of use with the seal band 60 being in position of snug engagement with the outer surface 72 of the shaft 62.

In this illustration, the auxiliary or secondary lip 24 is shown to engage the shaft surface 72 with only a slight pressure, and consequently not to be deformed, while the primary lip area 22 is shown to be deformed considerably, it being understood that the seal in its intended application would be exposed to considerable pressure in the area generally designated 77 in FIG. 3.

Figure 4:
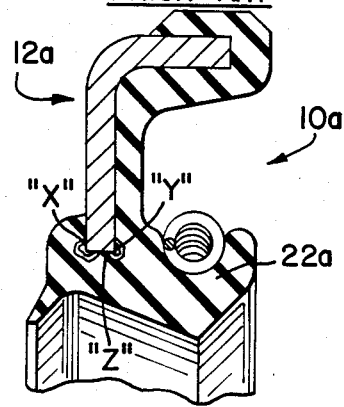
FIG. 4 is a vertical sectional view of a portion of a prior art seal, illustrating the shortcomings of such seals when used in high pressure environments.
Figure 5:
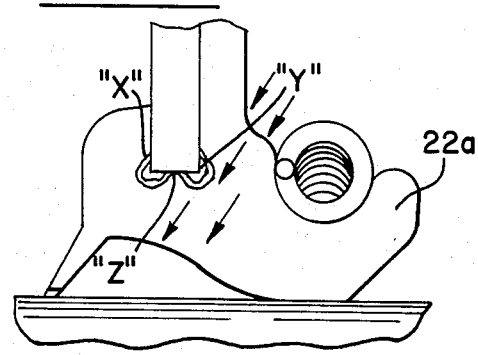
FIG. 5 is a sectional view, similar to that of FIG. 4 but taken on an enlarged scale, and further illustrating the drawbacks of prior art seals.

Referring now to FIGS. 4 and 5, a prior art seal 10a is shown to include a casing 12a and a lip body 22a similar to those of the present invention. In FIGS. 4 and 5, areas of stress concentration are illustrated diagramatically at points "X" and "Y", it being shown that the rubber body is in the process of separating along the sharp edges "Z" of the inner margin of the seal casing.

It has been found that seal failure in this area is common, and is believed to arise from the exertion of extremely high pressures, particularly intermittent pressures, as shown by the arrows in FIG. 5. These forces attempt to deflect the elastomer radially inwardly in the area of the inner margins of the seal casing 12a, leading to initial tearing or rupturing of the bond, or the elastomer in the vicinity of the bond.

As time elapses, the stress concentrations in this area continue and the cracks or tears are propagated along the circumferential extent of the casing, eventually leading outwardly as shown into the body of the seal. This in turn leads to increased flexing and deformation with the resulting aggrevation of the injury to the seal, following which it fails prematurely.

Thus, while seals of this type were anticipated to undergo the greatest wear adjacent the primary seal surface or the region of relative motion between the seal shaft and the seal itself, it has been discovered that such seals often under go undesirable motion sequences, including excessive deflection, because of failure of the bond between the body and the innermost portions of the seal casing. This in turn is believed to have arisen as a result of sharp edges and square cornered surfaces in the vicinity of significant stress.

In this connection, it will be realized that, in addition to the stresses shown in schematically by the arrows in FIG. 5 as being radial, there are also circumferential stresses occurring in seals of this type, such stresses usually arising as the seal part undergoes intermittent or stop-and-start motion, with the seal body developing a "stick-slip" relation to the sealed shaft, and this in turn applying circumferential slicing or shearing force to the seal body, occasioning premature failure.

Figure 6:
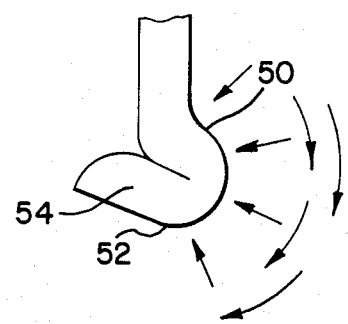
FIG. 6 is a vertical sectional view, also on an enlarged scale, showing the advantages and characteristics of the seal casing made according to the present invention

Referring again to the seal of the invention, FIG. 6 shows that a contoured inner margin of the casing is provided according to the invention, to spread stresses out throughout this area and to eliminate stress risers or concentrations. Consequently, referring to FIG. 6, it will be noted that the surfaces 50, 52, 54 are joined to each other along a gradual curve, and that stresses are informally distributed in these areas.

In most instances, provision of the mounting bead in the form shown, or in a similar form, provides about 2½ times the bonding area provided in most current stamping designs. Consequently, resistance to failure under pressure is increased. Furthermore, by providing a continuous seal body which includes a mounting bead 16 and the intermediate body or web portion 18, there is no exposed stamping/seal body interface which would itself constitute a stress riser. In other words, the portions of the seal exposed to high pressure include rubber covered portions only and do not include a line along which an exposed portion of the stamping is bonded to the rubber. Consequently, such areas, at which failure commonly begins, are eliminated with the present design.

It will thus be seen that the present invention provides an improved shaft seal for use in high pressure environments having a number of advantages and characteristics including those herein pointed out and others which are inherent in the invention. A preferred form of the invention having been shown by one example, it is anticipated that certain changes and modifications may be made to the described form of seal without departing from the spirit of the invention or the scope of the appended claims.

We claim:

1. An improved high pressure seal unit comprising, in combination, a casing portion and a sealing lip portion, said casing portion including at least one flange part adapted to be positioned adjacent a part of an associated sealed mechanism to locate said seal in an installed position of use; a generally radially extending flange joined to said first flange part and adapted to extend across and close off a portion of an opening defining a portion of a sealed region in which fluid may be confined under pressure, said radially extending flange also including one inner marginal surface directed toward said sealed region, and radially innermost mounting bead portion, said bead portion being contoured so as to have an enlarged cross-section with respect to the cross-section of the remaining portion of said casing portion and including a continuous smoothly curvilinear annular bonding surface which includes a first surface portion directed generally toward the fluid side of the seal, a second intermediate surface joined to said first surface and directed generally toward the inner diameter opening defined by said seal, and a third surface portion joined to said second surface portion and being directed at least partially away from said fluid side and toward the exterior of said sealed region, said sealing lip portion being made from an elastomer and including a primary seal lip body portion having first and second generally frusto-conical surfaces facing respectively at least partially toward and away from said sealed region and meeting to define a circumferentially extending primary seal band area of intended contact with an associated sealed shaft or like part, and a bonding portion completely surrounding and being permanently bonded to at least said first, second, and third surfaces of said casing portion.

2. A seal unit as defined in claim 1 wherein said sealing lip portion further includes surfaces defining an auxiliary excluder lip lying axially outwardly of said primary lip.

3. A seal unit as defined in claim 1 wherein said seal body further includes an annular web of material having a portion thereof bonded to a radially inner margin of an axially directed portion of said radial casing flange.

4. A seal unit as defined in claim 1 wherein a cylindrical body of elastomer forms the outermost diameter of said seal unit, said elastomeric body lying on the outside surface of said axial casing flange.

5. A seal unit as defined in claim 1 wherein said sealing lip portion further includes, as an integral portion thereof, a portion extending radially outwardly thereof and along an axially inwardly directed portion of said radially extending casing flange and being bonded thereto.

6. A seal unit as defined in claim 1 wherein said sealed body further includes an annular spring groove therein, said spring groove being located in substantially radially aligned relation to said primary seal band area.

7. A seal unit as defined in claim 1 wherein said seal body further includes an auxiliary sealing lip spaced axially outwardly of said primary seal band area.

8. A seal unit as defined in claim 1 wherein said bead portion of said casing comprises first and second thicknesses of the material forming said casing, said portions being connected to each other and joined at a bight portion, said second portion terminating in any upturned casing edge, and wherein said seal body further includes a portion completely surrounded and surrounding and bonded to said upturned edge portion of said casing.

9. An oil seal unit comprising, in combination, an elastomeric sealing lip portion and a casing portion made from a rigid material and having a mounting flange, a radially extending, offsetting flange, and an annular inner mounting bead formed by folding at least two thicknesses of the casing material upon each other so as to form first and second inclined flange portions connected to each other by a bight portion, one of said thicknesses terminating in an edge portion and with said bight portion presenting a rounded exterior surface portion directed generally toward said sealed region and the inner diameter of said seal, said sealing lip portion having air and oil side surfaces meeting each other along a circumferential locus to define a seal band, and having another portion bonded to and completely surrounding an inner margin of said radial casing flange and the exterior surfaces and edge portion of said material thicknesses forming said bead, to provide a bonded area adapted to resist failure under the application of high pressure.

10. An oil seal unit as defined claim 9 wherein said sealing lip portion further includes an additional body portion integrally formed therewith and having a bonding surface extending along and bonded to said offsetting casing flange.

11. An oil seal unit as defined in claim 9 wherein said sealing lip portion further includes an auxiliary excluder lip lying axially outwardly of said seal band.

* * * * *